US012103201B2

(12) United States Patent
Rosén et al.

(10) Patent No.: US 12,103,201 B2
(45) Date of Patent: Oct. 1, 2024

(54) HAND-HELD ELECTRICALLY POWERED CUT-OFF TOOL WITH A KICKBACK MITIGATION FUNCTION

(71) Applicant: HUSQVARNA AB, Huskvarna (SE)

(72) Inventors: Magnus Rosén, Alingsås (SE); Victor Johansson, Partille (SE); David Dufke, Veberöd (SE); Johan Berg, Alingsås (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/032,260

(22) PCT Filed: Sep. 13, 2021

(86) PCT No.: PCT/SE2021/050875
§ 371 (c)(1),
(2) Date: Apr. 17, 2023

(87) PCT Pub. No.: WO2022/086380
PCT Pub. Date: Apr. 28, 2022

(65) Prior Publication Data
US 2023/0396056 A1     Dec. 7, 2023

(30) Foreign Application Priority Data
Oct. 19, 2020   (SE) .................... 2051213-3

(51) Int. Cl.
*B28D 7/00*       (2006.01)
*B25F 5/00*       (2006.01)
(Continued)

(52) U.S. Cl.
CPC ............ *B28D 7/005* (2013.01); *B25F 5/00* (2013.01); *B28D 1/04* (2013.01); *H02H 7/0854* (2013.01);
(Continued)

(58) Field of Classification Search
CPC ........ B28D 7/005; B28D 1/045; B28D 1/082; H02K 7/145; H02P 3/22; H02P 6/182;
(Continued)

(56) References Cited

U.S. PATENT DOCUMENTS 4,249,117 A * 2/1981 Leukhardt ............ B23D 59/008
                                                    318/434
4,267,914 A    5/1981 Saar
(Continued)

FOREIGN PATENT DOCUMENTS

EP    0018603 B1    4/1984
EP    1201373 B1    9/2008
(Continued)

OTHER PUBLICATIONS

International Search Report and Written Opinion for PCT Application No. PCT/SE2021/050875 mailed on Dec. 8, 2021.
(Continued)

*Primary Examiner* — Nathaniel C Chukwurah
(74) *Attorney, Agent, or Firm* — Burr & Forman LLP

(57) ABSTRACT

A hand-held electrically powered cut-off tool (100) for cutting concrete and stone by a rotatable cutting disc (105), the cut-off tool (100) comprising an electric motor (130) arranged to be controlled by a control unit (110) via a motor control interface (120), wherein the control unit (110) is arranged to obtain data indicative of an angular velocity of the cutting disc (105), and to detect a kickback condition based on a decrease in angular velocity, and wherein the control unit (110) is arranged to electromagnetically brake the electric motor (130) in response to detecting a kickback condition.

20 Claims, 4 Drawing Sheets

(51) Int. Cl.
*B28D 1/04* (2006.01)
*H02H 7/085* (2006.01)
*H02K 7/14* (2006.01)
*H02P 3/22* (2006.01)
*H02P 6/182* (2016.01)
*H02P 21/14* (2016.01)
*B27G 19/04* (2006.01)

(52) U.S. Cl.
CPC .............. *H02K 7/145* (2013.01); *H02P 3/22* (2013.01); *H02P 6/182* (2013.01); *H02P 21/143* (2013.01); *B27G 19/04* (2013.01)

(58) Field of Classification Search
CPC .... B23D 59/008; B23D 45/16; B23D 57/023; B23Q 11/04; B27B 5/38; B27B 17/02; F16P 3/00; G01P 3/489; H02H 7/0854; B25F 5/02; B25F 5/008; H01M 10/6556; H01M 10/6563; H01M 50/244; H01M 50/247; H01M 50/262; H01M 50/296; H01M 2220/30; F16F 7/1028; F16F 15/085; F16F 2228/007; F16F 15/04; B26B 25/00; Y02E 60/10; B27G 19/04
See application file for complete search history.

(56) References Cited

U.S. PATENT DOCUMENTS

| | | |
|---|---|---|
| 4,432,139 A * | 2/1984 | Kohler .................. B27B 17/083 30/381 |
| 7,055,620 B2 | 6/2006 | Nadig et al. |
| 7,372,226 B2 | 5/2008 | Wiker et al. |
| 7,410,006 B2 | 8/2008 | Zhang et al. |
| 8,316,958 B2 | 11/2012 | Schell et al. |
| 8,786,220 B2 | 7/2014 | Single et al. |
| 9,144,875 B2 | 9/2015 | Schlesak et al. |
| 9,364,944 B2 | 6/2016 | Aoki |
| 9,614,466 B2 | 4/2017 | Usselman et al. |
| 9,776,338 B2 | 10/2017 | Abe et al. |
| 9,833,891 B2 | 12/2017 | Patterson |
| 9,962,807 B2 | 5/2018 | Klee et al. |
| 10,144,122 B2 | 12/2018 | Steurer |
| 10,144,148 B2 | 12/2018 | Laghate et al. |
| 10,589,413 B2 | 3/2020 | Goble |
| 10,630,223 B2 | 4/2020 | Yamaguchi et al. |
| 10,666,168 B2 | 5/2020 | Takeda |
| 10,675,747 B2 | 6/2020 | Gut et al. |
| 2008/0021590 A1 | 1/2008 | Vanko et al. |
| 2011/0007436 A1 | 1/2011 | Single et al. |
| 2014/0166323 A1 | 6/2014 | Cooper |
| 2015/0137721 A1 | 5/2015 | Yamamoto et al. |
| 2017/0234484 A1 | 8/2017 | Vanko et al. |
| 2018/0038546 A1 | 2/2018 | Nishimiya et al. |
| 2018/0099399 A1 | 4/2018 | Sunabe et al. |
| 2019/0084107 A1 | 3/2019 | Yabuguchi |
| 2019/0126456 A1 * | 5/2019 | Abbott ................... B25F 5/02 |
| 2019/0128474 A1 | 5/2019 | Sun et al. |
| 2020/0206887 A1 | 7/2020 | Schmid et al. |

FOREIGN PATENT DOCUMENTS

| | | |
|---|---|---|
| EP | 1398119 B1 | 4/2010 |
| EP | 2205395 B1 | 11/2012 |
| EP | 2465654 B1 | 7/2017 |
| EP | 3260242 A1 | 12/2017 |
| EP | 2520397 B1 | 8/2018 |
| EP | 3197650 B1 | 12/2019 |
| EP | 3684546 A1 | 7/2020 |
| JP | H0866074 A2 | 3/1996 |
| WO | 2020108569 A1 | 6/2020 |

OTHER PUBLICATIONS

Search Report and Office Action for Swedish Application No. 2051213-3 mailed on Jun. 1, 2021.
International Search Report and Written Opinion for PCT Application No. PCT/SE2021/050902 mailed on Nov. 10, 2021.
International Search Report and Written Opinion for PCT Application No. PCT/SE2021/050903 mailed on Nov. 16, 2021.
R.Bojoi, "Sensorless Control of PM Motor Drives—a Technology Status Review", Mar. 11, 2013 (Mar. 11, 2013), XP093177573, Retrieved from the Internet : URL: https://ieeexplore.ieee.org/stampPDF.jsp?=tp=&arnumber=6525177&ref=aHR0cHM6Ly9zY2hvbGFyLmdvb2dsZS5jb20v, Equation 14, p. 173.

* cited by examiner

A-A

HAND-HELD ELECTRICALLY POWERED CUT-OFF TOOL WITH A KICKBACK MITIGATION FUNCTION

TECHNICAL FIELD

The present disclosure relates to electrically powered hand-held cut-off tools for cutting concrete and stone, and in particular to kickback mitigation systems specifically tailored for such tools.

BACKGROUND

Cut-off tools for processing hard materials such as concrete and stone require powerful motors which provide the necessary energy to process the hard materials. Electrically powered cut-off tools have recently been introduced. These machines comprise high performance batteries which power high torque electric motors. Some electrically powered cut-off tools are also powered via cable from electrical mains.

On rare occasions, the rotating cutting disc of the cut-off tool enters into locking contact with the object that is processed. Due to the large amounts of kinetic energy stored in the rapidly rotating cutting disc, the disc will be ejected from the object and the cut-off tool will move upwards and backwards towards the operator. This is referred to as a kickback condition, and it may cause severe injury to the operator. It is therefore highly desirable to avoid kickback events, and to mitigate the effects of a kickback event if it should anyway occur.

U.S. Pat. No. 10,675,694 B2 discloses a braking device able to quickly stop rotation of a rotating cutting disc with high inertia. A brake unit acts on a belt drive of a cut-off tool to efficiently brake a cutting disc from a state of high kinetic energy.

U.S. Pat. No. 8,413,340 B2 discloses a safety guard assembly for mitigating the harmful effects of a kickback event. The assembly includes a safety guard, a locking mechanism, and a weight. In a kick-back situation, the locking mechanism quickly releases, and the weight forces the guard to swing rapidly down over the guard, thereby providing protection from the saw blade.

US 2011/0007436 A1 discloses devices and methods for safety precaution in electrical tools. The disclosure comprises a sensor unit which is designed to generate a sensor signal based on, e.g., a motor current of an electric motor. The sensor signal can be used to trigger an electric braking action by the electric motor.

EP 3 260 242 A1 and US 2020/0206887 A1 also relate to safety mechanisms for use with electrical powertools, which mechanisms comprise detection of a kickback event based on a change in rotation of a rotatable tool, followed by a braking action to slow down the tool.

However, there is a continuing need for improved kickback mitigation system.

SUMMARY

It is an object of the present disclosure to provide electrically powered hand-held cut-off tools with improved kickback mitigation systems. This object is obtained by a hand-held electrically powered cut-off tool for cutting concrete and stone by a rotatable cutting disc. The cut-off tool comprises an electric motor arranged to be controlled by a control unit via a motor control interface. The control unit is arranged to obtain data indicative of an angular velocity of the cutting disc, and to detect a kickback condition based on an abrupt decrease in angular velocity. The control unit is also arranged to control an electromagnetic braking of the electric motor in response to detecting a kickback condition, and preferably also to actively regulate an energy outtake from the electric motor over the control interface during the electromagnetic braking.

This way a kickback condition can be detected very rapidly by the control unit, and the electromagnetic braking can be made powerful enough such that the kickback event can be stopped well before the event becomes dangerous to an operator of the cut-off tool. In fact, in most cases the kickback mitigation systems discussed herein are able to halt the kickback event before the cutting disc even leaves the object which is being cut. The braking operation is preferably a controlled braking operation which is regulated by the control unit. This controlled energy outtake from the electric motor reduces the risk for component damage and the like, while still providing efficient kickback mitigation.

According to aspects, the control unit is arranged to estimate a rotor angle of the electric motor based on a measured current over the control interface, and to obtain the data indicative of angular velocity as a difference of the rotor angle over time. Several methods for estimating rotor angle based on measurements of current over the control interface between control unit and electric motor are known. These methods advantageously do not require external sensors for measuring rotor angle. For instance, the control unit can be arranged to determine an angular position of a rotor of the electric motor based on data indicative of a rotor flux angle of the electric motor, and to obtain the data indicative of angular velocity as a difference of the rotor angular position over time. Since the rotor angle determination can be done without signals from external sensors, the entire kickback mitigation system disclosed herein can be integrated in its entirety in the control unit and electric motor assembly, which is an advantage. Advantageously, there is no need for advanced braking devices such as that disclosed in U.S. Pat. No. 10,675,694 B2.

According to aspects, the hand-held electrically powered cut-off tool comprises an energy dissipating module configured to dissipate energy from the electric motor during the electromagnetic braking in a controlled manner. This energy dissipating module can be used by the control unit to perform braking in a controlled manner without risking, e.g., too high energy levels in the control unit circuitry, in the electric machine windings, or on the control interface. The energy dissipating module may, for instance, comprise any of a resistance, a super-capacitor, a cable connection to electrical mains and/or a battery configured with an energy absorption capacity.

According to aspects, the control unit is arranged to obtain the data indicative of the rotor flux angle of the electric motor based on a measured current over the control interface. This measurement of current is not associated with any significant implementation complexity in the control unit, which is an advantage. However, the control unit may also be arranged to obtain the data indicative of a rotational velocity of the cutting disc at least in part from an external sensor, such as a Hall effect sensor or the like configured to measure rotations of the electric motor shaft. The external sensor can be used as an alternative to the current measurements on the control interface, or in combination with the current measurements on the control interface for increased reliability.

According to aspects, the control unit is arranged to process the data indicative of the angular velocity of the cutting disc by a first low-pass filter and by a second low-pass filter, where the first low-pass filter has a larger bandwidth compared to the second low-pass filter. The first low-pass filter is applied for kickback event detection, and the second low-pass filter is applied otherwise.

This way the normal electric motor control is associated with a larger noise suppression since a lower bandwidth low-pass filter is used. The kickback event detection is preferably more rapid, which is why the higher bandwidth filter is used. Thus a robust motor control is provided while at the same time a rapid kickback detection is enabled.

According to some aspects, the speed regulator function is bypassed when the control unit controls the electromagnetic braking during a kickback event to enable a more rapid braking operation.

According to aspects, the control unit is arranged to determine an angular acceleration associated with the electric motor, and to detect the kickback condition based on a comparison between the determined angular acceleration and a detection threshold. This is a relatively low complexity detection principle which nevertheless provides robust detection performance associated with a high detection probability and a low probability of false alarm.

According to aspects, the control unit is arranged to detect the kickback condition also based on an angular velocity associated with the electric motor by conditioning kickback detection based on a minimum angular velocity. This way false detections during, e.g., tool start from standstill is avoided, which is an advantage. The detection threshold can be manually configurable or arranged to be automatically configured by the control unit, e.g., in dependence of tool inertia, or configured via wired or wireless link from a remote device, such as a smart phone or a remote server. Thus, an operator can use a display on the device to set the threshold to some desired value, i.e., if the kickback detection mechanism is experienced as too sensitive, then the operator can adjust the detection threshold to obtain a more desirable behavior. A remote operator can also configure the threshold, e.g., as part of a software upgrade, or in case an operator submits a request for reconfiguration of the threshold. The configuration can of course also be made from a wireless device, such as a smart phone or tablet device.

According to aspects, the control unit is arranged to obtain data indicative of a tool diameter or indicative of a tool inertia of the rotatable cutting disc, and to adjust the detection threshold based on the data indicative of tool diameter or tool inertia. This way kickback detection can be optimized to suit operation with a given tool. Some more heavy cutting discs may be associated with slightly different behavior in terms of decreased acceleration during kickback events compared to lighter cutting discs. If the tool inertia is approximately known, such differences can be compensated for in order to obtain a more reliable and accurate kickback detection mechanism. The control unit may for instance be arranged to obtain the data indicative of the tool diameter or tool inertia from manual input, or based on a calculated or an estimated tool inertia, wherein the tool inertia is arranged to be determined based on a current drawn by the electric motor during acceleration, e.g., from a standstill or low velocity condition. Thus, a robust mechanism for estimating tool inertia without external sensors or the like is provided. This mechanism can be applied to any cutting disc attached to the tool which is an advantage.

According to aspects, the cut-off tool comprises a radio frequency identification (RFID) reader, and the control unit is arranged to obtain the data indicative of the tool diameter or tool inertia from an RFID device embedded into the cutting disc via the RFID reader. This way the tool diameter or tool inertia data is obtained directly from the cutting disc in a reliable manner. When the cutting disc is replaced by another cutting disc, the data is automatically updated.

According to aspects, the cut-off tool comprises means for detecting tool identification data (ID) from an optically readable tag arranged on the tool or on a tool packaging associated with the tool, and to obtain the data indicative of the tool diameter or tool inertia based on the tool ID. The cut-off tool may, for instance, be configured to contact a remote server or the like to obtain the required cutting disc data. The call to the remote server may comprise the tool ID obtained from the optically readable tag. The cut-off tool may comprise a radio transceiver, and the control unit can be arranged to obtain the data indicative of the tool diameter or tool inertia from the remote server via the radio transceiver.

According to aspects, the control unit is configured to control the electromagnetic braking of the electric motor by applying a configurable braking torque in dependence of a pre-determined time limit for braking the rotatable cutting disc. This means that the control unit does not always need to apply maximum braking force, and thereby spare components such as a braking resistor and other electrical components from increased wear due to hard use.

According to aspects, the control unit is configured to control the electromagnetic braking of the electric motor to generate a torque determined in dependence of a direct current (DC) bus voltage of the cut-off tool. This is a relatively simple method for controlling the applied torque. It also protects large parts of the control unit circuitry from dangerously high DC levels in an efficient manner.

According to aspects, the control unit is configured to control the electromagnetic braking of the electric motor to generate a torque determined in dependence of an energy dissipating capability of the energy dissipating module. The energy dissipating module is associated with a maximum energy dissipating capability, i.e., a maximum amount which can be dissipated over a period of time. By generating braking torque in dependence of this energy dissipating capability, overloading the energy dissipating module can be prevented.

According to aspects, a DC bus voltage of the cut-off tool is regulated by switching a device associated with an impedance during electromagnetic braking of the electric motor. This switching mechanism provides a relatively simple yet reliable mechanism for regulating the DC voltage.

According to aspects, the control unit is configured to control the electromagnetic braking of the electric motor to generate a braking torque below a maximum braking torque level associated with a maximum rate of change in motor shaft angular speed. If the electric motor is braked too rapidly, the estimate of rotor angle may suffer in accuracy, which in turn will degrade braking capability. By generating a braking torque below the maximum braking torque level, the estimate of rotor angle can be kept at an accurate level such that the braking performance is not reduced.

According to aspects, the cut-off tool comprises a support arm and the rotatable cutting disc is arranged to be driven by the electric motor via a belt drive and a geared transmission. This allows for a gear ratio which reduces the torque requirements on the electric motor and control unit assembly during the kickback mitigation braking.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
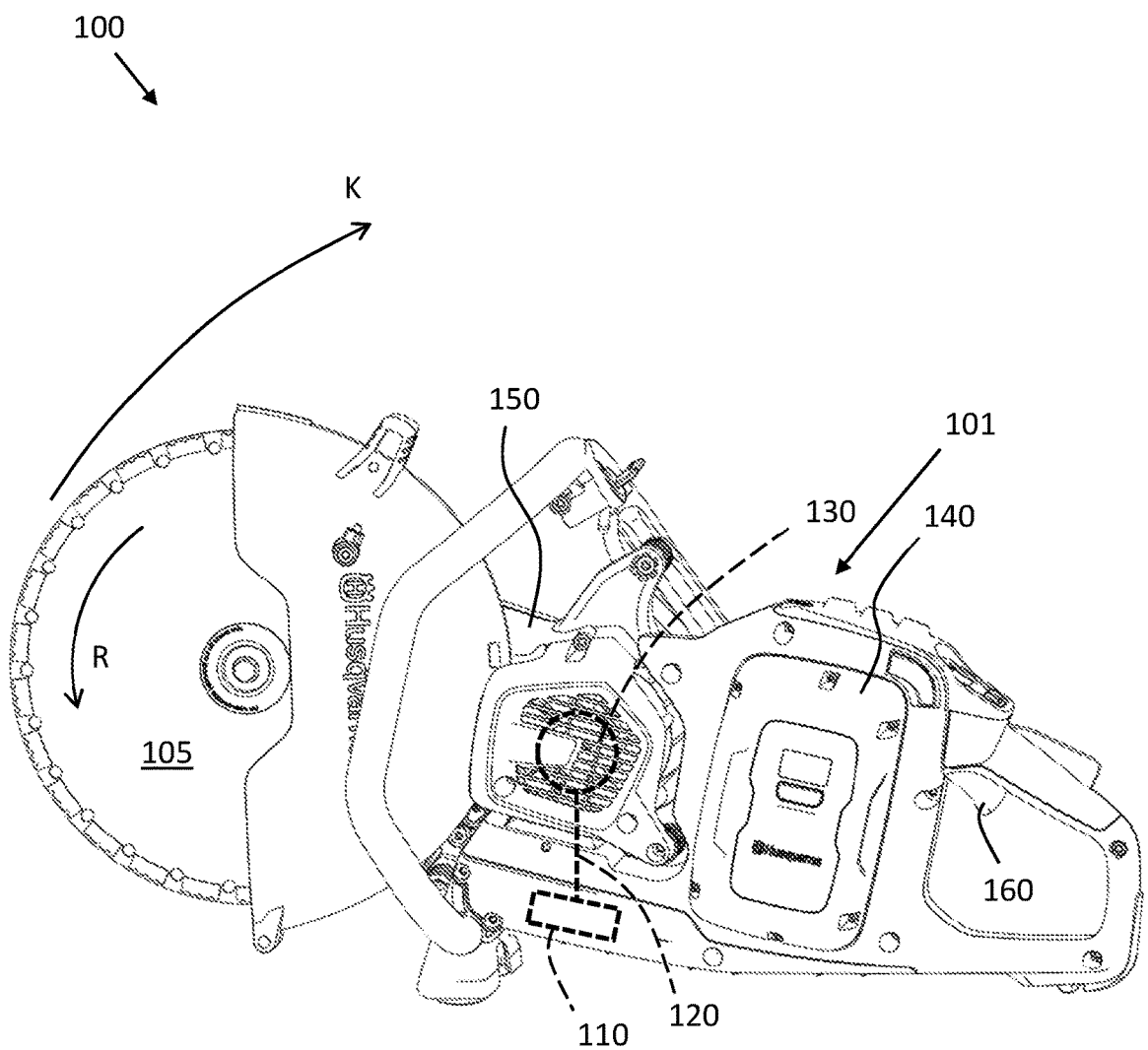
FIG. 1 shows an example of an electrically powered cut-off tool.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows a hand-held electrically powered cut-off tool 100 for cutting into hard materials such as concrete and stone. The tool 100 comprises a rotatable circular cutting disc 105, which may also be referred to as a cutting blade, mounted on a support arm 150. The cutting disc 105 is normally brought into rotation in a down-cut direction R, i.e., downwards into the object to be cut. The cutting disc 105 is arranged for abrasive operation, by means of cutting segments on the periphery of the cutting disc 105, where the cutting segments comprise diamond granules or the like.

An electric motor 130 is arranged to drive the cutting tool via a drive arrangement in the support arm. This motor is powered from an electrical energy storage device 140, such as a battery or a super-capacitor. Alternatively, the electric motor may be powered from electrical mains via cable. An example drive arrangement for driving the cutting disc 105 by the electric motor 130 will be discussed in more detail below in connection to FIGS. 6-8. This drive arrangement is based on a combination of gears and a belt to reduce requirements on the strength of the belt and also to reduce the requirements on electric motor torque. However, normal belt drives with two pulleys and an endless belt can of course also be used.

Figure 2:
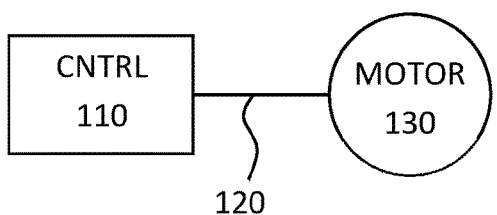
FIG. 2 schematically illustrates a general electric motor control system.

With reference again to FIG. 1, the electric motor is controlled by a control unit 110 via a motor interface 120. This is also schematically shown in FIG. 2 and in FIG. 3. The motor interface may vary in function and physical realization, but the control unit 110 controls electric motor speed over the interface, and may both accelerate and decelerate, i.e., brake, the electric motor via the motor interface 120.

The machine body 101 may comprise a display unit configured to display various status messages to an operator of the tool 100. This display unit may also comprise input means, which the operator can use to configure various parameters of the device. For instance, the operator can use the input means to select or otherwise configure a sensitivity level of a kickback detection mechanism, which will be discussed in more detail below.

The tool 100 may also comprise a transceiver arranged to communicate with a remote device, such as a remote wireless device. This device can then also be used to configure one or more parameters on the tool, such as the sensitivity of a kickback detection and mitigation function.

The motor is preferably a permanent magnet synchronous motor (PMSM) which is an alternating current (AC) synchronous motor whose field excitation is provided by permanent magnets, and which has a sinusoidal counter-electromotive force (counter EMF) waveform, also known as back electromotive force (back EMF) waveform. PMSM motors are known in general and will therefore not be discussed in more detail herein. For instance, similar electrical motors including associated control methods are discussed in "Electric Motors and Drives" (Fifth Edition), Elsevier, ISBN 978-0-08-102615-1, 2019, by Austin Hughes and Bill Drury.

Figure 3:
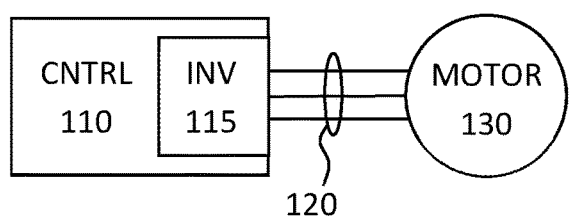
FIG. 3 schematically illustrates a three-phase electric motor control system based on an inverter.

The motor 130 may be a three-phase motor as schematically shown in FIG. 3. In this case the motor interface 120 comprises three wires for energizing the motor windings. The wires are fed from an inverter 115 which is normally controlled by a current command from the control unit 110. An inverter is a module which generates one or more phases of alternating current, normally from a DC feed. By controlling the frequency and voltage of the phases over the motor interface 120, the electromagnetic field in the motor can be brought into a controlled rotation to generate a positive torque by the motor shaft, which then can be used to power the cutting disc 105. The electric motor can also be used to provide negative torque to the motor shaft, i.e., to brake to cutting disc 105.

The present disclosure relates to a kickback mitigation function for hand-held electrically powered cut-off tools which relies on quickly detecting onset of a kickback event, followed by a controlled and resolute application of negative torque by the electric motor to rapidly brake the cutting disc 105. It has long been thought that electromagnetic braking cannot be applied fast enough and with enough force to mitigate kickback in high power cut-off tools, mainly since the cutting disc stores so much kinetic energy during operation. However, by the techniques disclosed herein, kickback mitigation in high power cut-off tools is enabled. The techniques do not require a mechanical brake, which is an advantage. Another advantage is that there is no requirement of any external sensors to detect the kickback condition, since the control unit can perform reliable detection based solely on the signals over motor interface 120. However, it is appreciated that external sensors can be used to complement the system in order to provide an increased level of reliability and robustness. Furthermore, the kickback mitigation mechanism which will be described in the following is so fast that it is often able to stop the kickback before the cutting disc even leaves the object, which is being cut, thereby preventing all harmful effects of the kickback event.

Electromagnetic braking of electrically powered handheld tools has been proposed before, but for other applications with much less strict requirements on detection delay and generated braking torque. For instance, hammer drills and the like are associated with a significantly smaller kinetic energy and are thus much more easily braked. U.S. Pat. Nos. 10,675,747 B2 and 7,055,620 B2 show electromagnetic braking systems for mitigating effects of stuck drill bits, which are not directly applicable for kickback mitigation in high powered cut-off tools.

U.S. Pat. No. 10,630,223 B2 describes another example of a power tool comprising means to brake a rotatable tool automatically based on electromagnetic braking principles. The disclosure describes a mechanism for detecting a kickback condition based on an external sensor, such as a Hall effect sensor. The sensor is configured to measure a number of rotations of a rotatable work tool. If the number of rotations has decreased significantly from one time instant to another, then a kickback condition is detected, and a response is triggered. This polling operation is most likely not fast enough to respond to a cut-off tool kickback condition in a timely manner, i.e., within a few milliseconds from onset of the kickback condition. The braking action described in U.S. Pat. No. 10,630,223 B2 mainly comprises disconnecting the electric motor from the power source in order to avoid damage to a workpiece, which is a rather rudimentary form of braking not likely to be able to cope with the large amounts of kinetic energy present in handheld electrically powered cut-off tools. Also, there is no disclosure of any actively regulated or controlled braking function. Rather, the braking operation relies on mechanical switching of resistances. Once triggered, the counter EMF of the system described in U.S. Pat. No. 10,630,223 B2 will depend on the angular velocity of the electric motor shaft, so the applied braking torque will be a function of the rotational velocity of the tool and cannot be controlled. To summarize, the mechanisms disclosed in U.S. Pat. No. 10,630,223 B2 are not ideal for mitigating kickback effects in high power cut-off tools where the amount of kinetic energy is very large compared to other types of power tools such as drills, grinders, and handheld saws.

To provide a kickback mitigation function which is suitable also for high powered cut-off tools associated with significant tool inertia, that responds fast enough and with sufficient braking force, there is disclosed herein a hand-held electrically powered cut-off tool 100 for cutting concrete and stone by a rotatable cutting disc 105. The cut-off tool 100 comprises an electric motor 130 arranged to be controlled by a control unit 110 via a motor control interface 120. The control unit 110 is arranged to obtain data indicative of an angular velocity of the cutting disc 105, and to detect a kickback condition based on a decrease in angular velocity. The control unit 110 is arranged to control electromagnetic braking of the electric motor 130 in response to detecting a kickback condition, and optionally also to actively regulate an energy outtake from the electric motor 130 over the control interface 120 during the electromagnetic braking.

Herein, "indicative of an angular velocity" is to be construed as any data value or sequence of data values from which an angular velocity of the cutting disc can be inferred, at least approximately. Thus, a time sequence of rotation angle values is indicative of angular velocity since velocity can be obtained from the sequence by differentiation. A time sequence of acceleration values is also indicative of angular velocity since angular velocity can be inferred from the acceleration values by integration. Thus, it is appreciated that there are many ways to represent data indicative of angular velocity.

In the same way, there are many ways in which a kickback condition can be detected "based on a decrease in angular velocity", starting from different types of data, and using different methods. A number of such methods will be discussed herein, although it is appreciated that this is not to be construed as an exhaustive list of embodiments in which the present techniques may be carried out.

The detection mechanism is based on monitoring the angular velocity of the cutting disc 105. If an abrupt decrease in velocity is seen, such as a high level of retardation in electric rotor angle or cutting disc angle, a kickback condition is detected. The details of the kickback event detection mechanism will be discussed in more detail below. Immediately after a kickback event has been detected by the control unit 110, the electric motor is forcefully braked in order to mitigate the effects of the kickback event. This braking involves an active control of the energy outtake from the electric motor in order to provide a strong braking force without damaging the electrical components of the cut-off tool.

As mentioned above, the kickback detection and braking of the cutting disc is often so rapid as to stop the blade before it even leaves the object which is processed. Thus, the upwards and backwards motion K in FIG. 1 can often be avoided altogether. Even if some kickback motion occurs, the energy transferred from the cutting disc 105 to the machine body 101 will be reduced to a level as to mitigate the harmful effects of the kickback event. Notably, the electric motor is not just disconnected from the power source 140 as in many of the prior art documents. Rather, the energy outtake from the electric motor is actively regulated to provide a strong enough braking action to halt the kickback event.

For instance, according to some aspects, the current from the motor is regulated actively during braking, and it can therefore be maximized independently of electric motor angular speed. This means that braking can be controlled during the braking process to always maintain strong braking effect. If a resistance is simply switched in as in some of the prior art, the counter-EMF of the electric motor will determine the braking force, thus leaving much room for improvement in braking capability.

The limiting factor in providing a strong braking torque is the energy dissipating capability of the electrical system. To brake the cutting disc 105, its kinetic energy must be transferred away from the cutting disc and dissipated by the system. The energy transfer must also be fast enough since otherwise the kinetic energy is transferred into the machine body 101 to generate the kickback movement K. This energy transfer is done electrically in the proposed design. Thus, no friction brakes or other complicated mechanical structures are required to provide the necessary braking torque.

Figure 4:
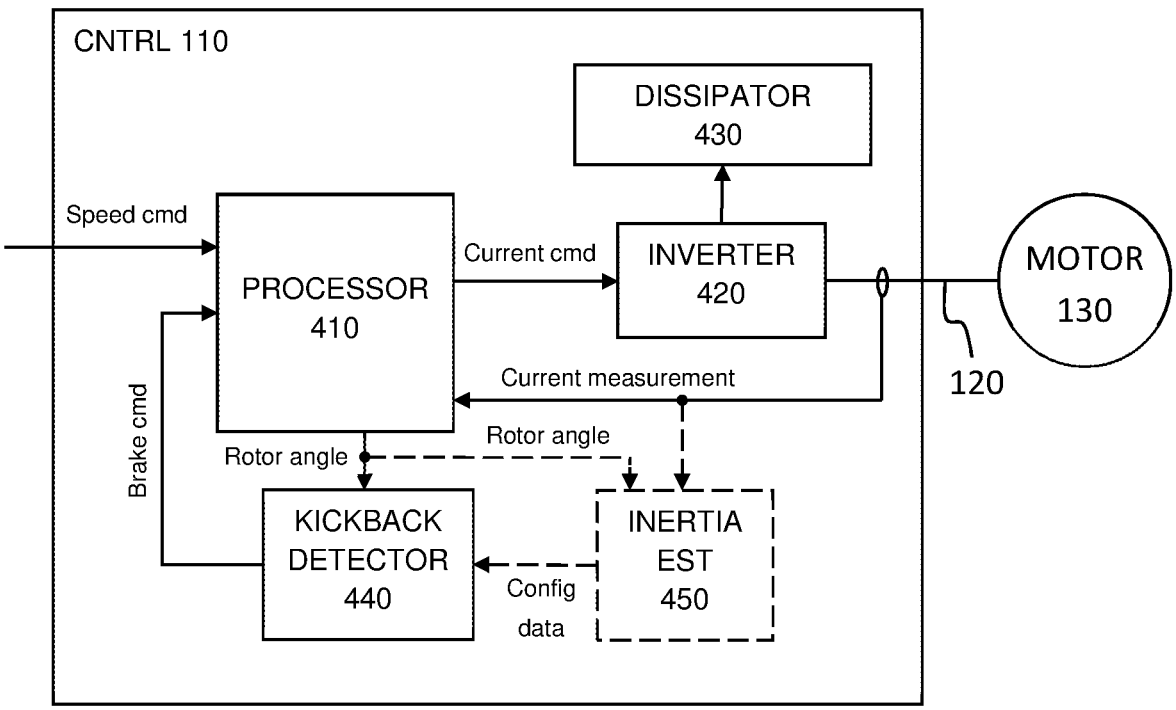
FIG. 4 is a functional view of an example kickback mitigation system.

FIG. 4 shows a functional view of an example kickback mitigation system. A speed command is obtained, e.g., from the trigger 160 of the tool 100. This speed command is input to a processor 410 which will be discussed in more detail below in connection to FIG. 10. The processor 410 converts the speed command into a current command which is sent to an inverter 420, which in turn controls the electric motor 130 via the motor interface 120. Generally, for most electric machines, a current command is sent to a current controller. The current controller then outputs a voltage command which is converted into duty cycles. The duty cycles are then set in the inverter hardware.

In case the motor 130 is a three-phase motor, the control interface 120 comprises three wires with respective phases. An energy dissipator 430 is connected to the inverter 420. This dissipator is configured to consume surplus energy in the system, i.e., to dissipate energy from the electric motor 130 during the electromagnetic braking, thereby protecting electrical components and the motor 130 itself from dangerously high voltages. The energy dissipating module 430 may comprise any of a resistance, a super-capacitor and/or a battery configured with an energy absorption capacity. According to some aspects, the dissipator module 430 is a resistance configured to be switched by the processor 410 in dependence of a DC voltage of a DC bus which feeds the inverter with power. This way the DC voltage level on the DC bus can be regulated to always be close to a target level, or set-point level, despite a large surge of energy coming from the electric motor 130 via the motor interface 120 during the hard braking required to mitigate a detected kickback event.

It is appreciated that the energy dissipating module 430 may be realized independently from the other aspects of the cut-off tools discussed herein. For instance, there is disclosed herein a hand-held electrically powered cut-off tool 100 for cutting concrete and stone by a rotatable cutting disc 105. The cut-off tool 100 comprises an electric motor 130 arranged to be controlled by a control unit 110 via a motor control interface 120. The control unit 110 is arranged to obtain data indicative of an angular velocity of the cutting disc 105, and to detect a kickback condition based on a decrease in angular velocity. The control unit 110 is arranged to control an electromagnetic braking of the electric motor 130 in response to detecting a kickback condition, and the electrically powered cut-off tool 100 comprises an energy dissipating module 430 configured to dissipate energy from the electric motor 130 during the electromagnetic braking.

According to a first example, the resistance is switched in if the DC bus voltage exceeds a first threshold and is switched out if the DC bus voltage goes below a second threshold. The first threshold is preferably configured higher than the second threshold, which effectively means that the switching mechanism is associated with hysteresis. This hysteresis provides a robust detection mechanism.

According to another example, a regulator such as a PID regulator is arranged with a set-point or target DC bus voltage value. This target DC bus voltage value is compared with the actual DC bus voltage value and the difference is used to determine a duty cycle for switching the resistance.

According to some aspects, the energy dissipating module 430 is notified when kickback condition is detected, whereupon the energy dissipating module can prepare to absorb surplus energy before that surplus energy arrives at the DC bus. The energy dissipating module 430 may, e.g., preemptively switch in the resistance or lower the relevant voltage thresholds or target voltage values for performing the switching. In this case it may be advantageous to also disconnect the power source, since otherwise current from the power source may be drawn.

A current measurement taken in connection to the motor interface 120 is fed back to the processor 410, whereby a closed loop motor control system is formed. According to some aspects, the control unit 110 is configured to electromagnetically brake the electric motor 130 by applying a configurable braking torque in dependence of a time limit for braking the rotatable cutting disc 105. This means that the applied braking torque can be configured for a particular tool in order to mitigate kickback events. Some tools may require more torque in order to be braked fast enough while other cutting tools may require less force. Thus, the risk to the electric motor from braking too hard or to other electric components can be reduced.

According to other aspects, the control unit 110 is configured to electromagnetically brake the electric motor 130 at a torque determined in dependence of a DC bus voltage of the cut-off tool 100. This way overload to the DC bus can be avoided, which is an advantage. For instance, the DC bus voltage can be regulated by switching a device associated with an impedance, such as a resistor, during electromagnetic braking of the electric motor 130.

The processor maintains an estimate of rotor angle. There are many known ways to estimate rotor angle in an electric machine, e.g., based on the current measurement as schematically illustrated in FIG. 4. For instance, in "Electric Motors and Drives" (Fifth Edition), Elsevier, ISBN 978-0-08-102615-1, 2019, Austin Hughes and Bill Drury discuss the topic at length.

One example of a method for estimating rotor angle based on a current measurement made on the control interface 120 will now be described. The method also uses a reference voltage associated with the electric motor, i.e., the reference voltage upon which the current regulator mechanism is based. It is assumed that the reference voltage (such as the reference voltage used by the current regulator for the electric motor) is sufficiently similar to the actual average voltage over the phases of the electric motor over a time window of interest. To clarify, the current regulator in the system generates the reference voltage to regulate the current. However, this can be implemented in a number of different ways, known in the art.

The reference voltage and control interface current are first transformed into a complex stationary domain, i.e., the motor current $i_{ab}$ and motor reference voltage $v_{ab}$ are represented as complex numbers. This is often referred to as a Clarkes transform.

$$i_{ab} = i_a + j^* i_b$$

$$v_{ab} = v_a + j^* v_b$$

Based on these vectors, the complex valued magnetic flux of the stator $$\psi_{s,ab} = \psi_{s,a} + j^* \psi_{s,b}$$

is estimated by integrating a difference between applied voltage and resistive voltage drop, adjusted by a damping factor which is proportional to a previously estimated stator flux. The damping factor is added mainly to make the estimated rotor angle value more robust.

Given the stator magnetic flux, a winding-induced flux is subtracted (derived based on a product of motor winding inductance and motor current) in order to obtain the complex rotor magnetic flux $$\psi_{r,ab} = \psi_{r,a} + j^* \psi_{r,b}$$

Thus, let R represent motor resistance and L represent motor inductance, then the electric motor equations in the complex ab-plane (after Clarkes transform) are given by $$v_a = R*i_a + \frac{d\psi_{s,a}}{dt}$$

$$v_b = R*i_b + \frac{d\psi_{s,b}}{dt}$$

which can be rewritten as $$\frac{d\psi_{s,a}}{dt} = v_a - R*i_a$$

$$\frac{d\psi_{s,b}}{dt} = v_b - R*i_b$$

These values could be directly integrated to obtain stator flux. However, a damping term is preferably introduced to stabilize the estimated rotor angle. One example of such a damping term operation is $\psi_{s,a}[k]+=(v_a[k]-R*i_a[k]-K*\psi_{s,a}[k-1])dt$ $\psi_{s,b}[k]+=(v_b[k]-R*i_b[k]-K*\psi_{s,b}[k-1])dt$ where K is a damping factor, $K*\psi_{s,a}[k-1]$ is the damping term referred to above, k is a time index, and dt is a time step of the recursion. The winding-induced flux is subtracted as $\psi_{r,a}[k]=\psi_{s,a}[k]-L*i_a[k]$ $\psi_{r,b}[k]=\psi_{s,b}[k]-L*i_b[k]$ This value is then optionally filtered by a low-pass filter or the like to suppress noise and distortion. If filtering is applied, then some delay compensation may be necessary to account for delays introduced by the filtering and also other delays incurred by, e.g., computation and the like.

The rotor angle can be found as an angle of the estimated rotor flux $\psi_{r,ab}$, i.e., a rotor flux angle. This angle can be determined, e.g., using a signed arcus tangent function, also known as an a tan 2 function $\alpha[k]=a\tan 2(\psi_{r,b}[k],\psi_{r,a}[k])+\beta$ where $\alpha$ is the rotor angle $\beta$ and where is an angle compensation configured to compensate for introduced delays, e.g., by filtering operations.

According to another example, the control unit 110 is arranged to determine an angular position of a rotor of the electric motor, i.e., a rotor angle, based on data indicative of a rotor flux angle of the electric motor, and to obtain the data indicative of angular velocity as a difference of the rotor angular position over time, i.e., a time derivative or time difference value. The control unit 110 may, for instance, be arranged to obtain the data indicative of the rotor flux angle of the electric motor based on a measured current over the control interface (120), or based on a measured or otherwise determined counter electromagnetic force (EMF) associated with the electric motor 130.

To improve the estimate of both rotor position and velocity, filtering can be applied to reduce measurement noise. Such filtering may comprise, e.g., normal low-pass filtering or more advanced filtering techniques such as Kalman filtering and the like. However, too much noise suppressing filtering may increase detection delay which is undesired.

According to some aspects, the control unit 110 is arranged to process the data indicative of the angular velocity of the cutting disc 105 by a first low-pass filter and by a second low-pass filter. The first low-pass filter has a larger bandwidth compared to the second low-pass filter. The first low-pass filter is applied for kickback event detection, and the second low-pass filter is applied otherwise. This way, during normal operation, noise suppression is high, but the system is not able to respond quickly to changes and it would incur too much delay in detecting a kickback event. According to an example, the angular position, i.e., the shaft or tool angle, is filtered by a filter to suppress noise and spurious disturbances, from which angular velocity is determined by a difference operation. After the initial filtering, two filters can be arranged to determine velocity, with different bandwidths. The lower bandwidth filter can then be used with advantage in controlling the electric machine, while the higher bandwidth can be used to detect kickback.

According to other aspects, the control unit 110 is configured to electromagnetically brake the electric motor 130 at a braking torque below a maximum braking torque level associated with a maximum rate of change in motor shaft angular speed. This means that the motor braking will be done in a controlled manner, which allows, e.g., to maintain an accurate estimate of the rotor angle in FIG. 4. If the rate of change in motor shaft angular speed goes above a pre-determined or configurable threshold, then the braking force can be reduced.

It is appreciated that the arrangements for detecting angular position and velocity without external sensors can be implemented independently of the braking methods used in the tool. Thus, there is also disclosed herein a hand-held electrically powered cut-off tool 100 for cutting concrete and stone by a rotatable cutting disc 105. The cut-off tool 100 comprises an electric motor 130 arranged to be controlled by a control unit 110 via a motor control interface 120. The control unit 110 is arranged to determine an angular position of a rotor of the electric motor 130 based on an estimated rotor flux angle of the electric motor, and to obtain data indicative of an angular velocity of the cutting disc 105 based on a rate of change of the angular position of the rotor over time. The control unit 110 is arranged to detect a kickback condition based on a decrease in angular velocity of the cutting disc 105, and to electromagnetically brake the electric motor 130 in response to detecting a kickback condition.

Figure 5:
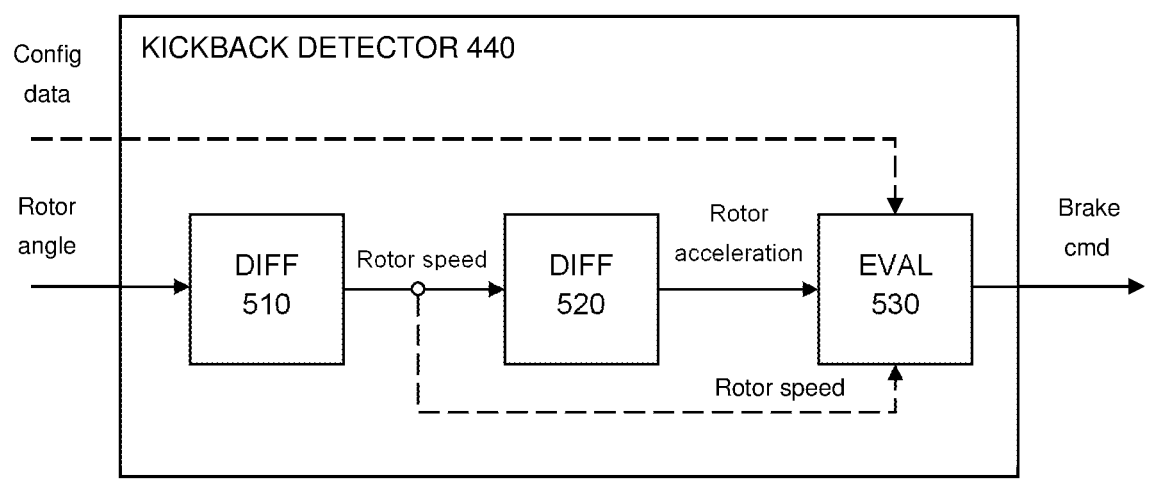
FIG. 5 schematically illustrates a kickback detection system.

An example functional view of the kickback detector module 440 is shown in FIG. 5. This module operates on rotor angle data which is first differentiated once 510 to obtained rotor speed and then again 520 to obtain rotor acceleration. The differentiation is optionally associated with a filtering operation to suppress measurement noise. However, it is appreciated that all such noise suppressing filtering increases detection delay which is undesirable, thus, a balance should be made between detection delay and noise suppression ability in the system, as discussed above.

Kickback detection is performed by an evaluation module 530 which compares the rotor acceleration to a detection threshold. If a sufficiently large negative acceleration is detected, then a kickback event is detected, and a brake command is issued by the evaluation module 530. In other words, the control unit 110 is arranged to determine an angular acceleration associated with the electric motor 130, and to detect the kickback condition based on a comparison between the determined angular acceleration and a detection threshold.

The aspects related to the implementation of a detection threshold may be realized independently from the other aspects disclosed herein. Thus, there is disclosed herein a hand-held electrically powered cut-off tool 100 for cutting concrete and stone by a rotatable cutting disc 105. The cut-off tool 100 comprises an electric motor 130 arranged to be controlled by a control unit 110 via a motor control interface 120. The control unit 110 is arranged to obtain data indicative of an angular velocity of the cutting disc 105, and to detect a kickback condition based on a decrease in angular velocity, and to control an electromagnetic braking of the electric motor 130 in response to detecting a kickback condition. The control unit 110 is arranged to determine an angular acceleration associated with the electric motor 130, and to detect the kickback condition based on a comparison between the determined angular acceleration and a configurable detection threshold. This configurable threshold may also be variable, in the sense that it is adapted to the current operating conditions of the cut-off tool.

The detection threshold may be configured either manually, or in dependence of some other machine-dependent parameter, such as a cutting disc specification. The detection threshold may also be arranged to be configured over wireless or wired link from a remote unit, such as a mobile device or a remote server.

Ideal detection thresholds can be arrived at through testing or by computer simulation. For instance, the detection threshold can be configured at an angular acceleration between 5000 rad/s$^2$ and 35000 rad/s$^2$, and preferably between 10000 rad/s$^2$ and 30000 rad/s$^2$.

If the tool diameter of the rotatable cutting disc 105 is about 10 inches, such as between 9 and 11 inches, then the detection threshold can be configured at an angular acceleration between 5000 rad/s$^2$ and 35000 rad/s$^2$, and preferably between 20000 rad/s$^2$ and 35000 rad/s$^2$.

If the tool diameter of the rotatable cutting disc 105 is about 12 inches, such as between 11 and 13 inches, then the detection threshold can be configured at an angular acceleration between 25000 rad/s$^2$ and 35000 rad/s$^2$, and preferably about 29000 rad/s$^2$.

If the tool diameter of the rotatable cutting disc 105 is about 14 inches, such as between 13 and 15 inches, then the detection threshold can be configured at an angular acceleration between 25000 rad/s$^2$ and 35000 rad/s$^2$, and preferably about 29000 rad/s$^2$.

If the tool diameter of the rotatable cutting disc 105 is about 16 inches, such as between 15 and 17 inches, then the detection threshold can be configured at an angular acceleration between 15000 rad/s$^2$ and 25000 rad/s$^2$, and preferably about 20000 rad/s$^2$.

Generally, the ideal detection threshold decreases with increased tool inertia, such that a large diameter tool has a smaller detection threshold compared to a small diameter tool.

The control unit is optionally arranged to prevent operation of the tool during a time window following detection of the kickback condition. This is because some tool components may become hot during the braking operation and needs to be cooled down before the tool can be used again. The time window can be between 5-30 seconds long, and preferably about 25 seconds. Of course, it is desired to reduce this time window as much as possible, since it can be a nuisance to an operator experiencing repeated kickback conditions. Consequently, it may be an advantage to set the time window in dependence of a tool inertia. In this case large inertia tools can have longer time windows compared to smaller inertia tools. The time window can also be configured in dependence of a temperature of the electric motor and/or energy dissipating module. In this case, the time window can be reduced in case the tool temperatures, and the motor temperature in particular, is relatively low, while the time window can be prolonged in case the temperature or temperatures are high. In fact, the time window can be arranged to be terminated by a temperature threshold instead of a time limit on the window.

According to other aspects, the control unit can be arranged to suppress detection of a kickback condition during a time period following start of the electric motor. This may reduce the number of false positives, i.e., kickback detections as a result of disturbances during tool start, where the motor currents may fluctuate some. The control unit may also be arranged to suppress detection of a kickback condition unless the tool engages an object to be cut. This can be detected via the motor currents since the motor experiences a change in load as he tool engages the object to be cut. This can also be detected by some other sensor arranged on the tool, like a strain gauge configured in connection to the arm holding the cutting disc, or a linear displacement sensor connected in-between the cutting disc 105 and the tool body, for instance between the support arm 150 and the machine body 101.

According to some aspects, the control unit 110 is arranged to detect the kickback condition also based on an angular velocity associated with the electric motor 130 by conditioning kickback detection based on a minimum angular velocity. This angular velocity may, e.g., be the estimated rotor speed which results from the first differentiator 510, perhaps with some additional filtering applied. The conditioning may, e.g., comprise requiring a certain minimum initial velocity in order to detect a kickback event. The rationale for this conditioning being that a severe kickback event normally does not take place at low rotational cutting disc velocities. Also, the estimate of rotor acceleration may be associated with large errors during a start-up phase when the cutting disc is accelerated from stand-still or from a low velocity.

Consequently, there is disclosed a hand-held electrically powered cut-off tool 100 for cutting concrete and stone by a rotatable cutting disc 105. The cut-off tool 100 comprises an electric motor 130 arranged to be controlled by a control unit 110 via a motor control interface 120. The control unit 110 is arranged to obtain data indicative of an angular velocity of the cutting disc 105, and to detect a kickback condition based on a decrease in angular velocity. The control unit 110 is also arranged to determine an angular acceleration associated with the electric motor 130, and to detect the kickback condition based on a comparison between the determined angular acceleration and a detection threshold if the angular velocity of the cutting disc 105 is above a velocity threshold. This way false detections can be avoided. Here as in most versions of the proposed concept, the detection threshold can be a variable detection threshold, e.g., one that is manually configurable or automatically determined in dependence of an operating condition or a type of cutting disc used.

There is also disclosed a hand-held electrically powered cut-off tool 100 for cutting concrete and stone by a rotatable cutting disc 105, the cut-off tool 100 comprising an electric motor 130 arranged to be controlled by a control unit 110 via a motor control interface 120, wherein the control unit 110 is arranged to obtain data indicative of an angular velocity of the cutting disc 105, and to detect a kickback condition based on a decrease in angular velocity, wherein the control unit 110 is arranged to determine an angular acceleration associated with the electric motor 130, and to detect the kickback condition based on a comparison between the determined angular acceleration and a detection threshold, where the variable detection threshold is arranged to be determined in dependence of one or more operating conditions of the tool 100 and/or in dependence of a configuration input signal. The operating conditions may, e.g., comprise tool inertia, tool type, tool angular velocity, or if the tool is engaging the object to be cut or not. The configuration input signal may be a signal obtained from an operator, or a configuration signal received as part of a configuration file, such as a configuration file received from a wireless device, a remote server, or other configuration entity. According to some aspects, the possibility to vary the variable detection threshold can be limited to be within some pre-determined range, in order to prevent inactivation or malfunction of the kickback detection system.

Thus, the configuration input signal may be generated by an operator using some form of input means, like an input display device on the machine body 101, or an input device arranged remote from the machine, such as a smartphone or other wireless device. The operator may then, e.g., select from a number of predefined cutting disc types (dimension, weight, etc.). The hand-held electrically powered cut-off tool 100 may furthermore be arranged to detect when a new cutting disc has been assembled on the support arm 150, and prompt the user for a new configuration before allowing operation, or simply trigger a notification with a request to configure the tool.

There is furthermore disclosed herein a hand-held electrically powered cut-off tool 100 for cutting concrete and stone by a rotatable cutting disc 105. The cut-off tool 100 comprises an electric motor 130 arranged to be controlled by a control unit 110 via a motor control interface 120 as discussed above. The control unit 110 is arranged to obtain data indicative of an angular velocity of the cutting disc 105, and to detect a kickback condition based on a decrease in angular velocity. The control unit 110 is also arranged to determine an angular acceleration associated with the electric motor 130, and to detect the kickback condition based on a comparison between the determined angular acceleration and a detection threshold selectable from at least two different threshold values. Thus, it is appreciated that the detection threshold is variable in the sense that is can be selected from a set of pre-configured thresholds. For instance, the detection threshold can be selected from the set in dependence of the current cutting disc that is mounted onto the machine. Different cutting discs are associated with different amounts of inertia when in use, and therefore ideally are to have different detection thresholds for detecting kickback condition. Generally, a heavier disc changes velocity more slow compared to a lighter weight cutting disc. Also, lighter weights cutting discs tend to exhibit more fluctuations in the velocity, requiring more filtering, i.e., a smaller bandwidth filter. Generally, the detection threshold can be configured at an angular acceleration between 5000 $rad/s^2$ and 35000 $rad/s^2$, and preferably between 10000 $rad/s^2$ and 30000 $rad/s^2$, and more preferably between 20000 $rad/s^2$ and 30000 $rad/s^2$, depending on the type of cutting disc used and the operating environment.

The detection threshold may according to one example be manually configurable. In this case configuration data is manually input to the evaluation module 530, where it is used to determine the detection threshold.

According to other aspects, the control unit 110 is arranged to obtain data indicative of a tool diameter or tool inertia of the rotatable cutting disc 105, and to adjust the detection threshold based on the data indicative of tool diameter or tool inertia. This data may, for instance, be obtained by the control unit 110 as manual input. Herein, data indicative of a tool diameter also indicates an amount of inertia associated with the cutting disc 105. The larger the inertia, the more kinetic energy must be handled during a kickback event. This means that different types of tools having different weights and different tool diameters may require different detection threshold in order for the kickback mitigation function to provide the desired performance.

The control unit 110 can also be arranged to obtain the data indicative of the tool diameter or tool inertia based on a calculated or estimated tool inertia. This tool inertia can, for instance, be determined based on a current drawn by the electric motor during acceleration from a standstill or low velocity condition, i.e., it can be determined from the current measurement on the control interface 120 in FIG. 4 during acceleration of the cutting disc 105. The processor 410 may comprise a look-up table or the like which allows for translating between estimated tool inertia values and suitable detection thresholds. Alternatively, an analytic function can be used to determine suitable detection thresholds from the estimated tool inertia. Also, low-pass filtering operations used to determine, e.g., rotor acceleration values, can be configured in dependence of such estimated tool inertia. This is because a high inertia tool is expected to change rotor velocity somewhat more slowly which may warrant a reduced filtering bandwidth to suppress more noise when estimating, e.g., rotor speed and rotor acceleration.

The cut-off tool may furthermore comprise a radio frequency identification (RFID) reader. In this case the control unit 110 can be arranged to obtain the data indicative of the tool diameter or tool inertia from an RFID device embedded into or otherwise arranged in connection to the cutting disc 105 via the RFID reader. According to another example, the tool data may be stored on a remote server. If the cut-off tool comprises a radio transceiver, the control unit 110 can be arranged to obtain data indicative of the tool diameter or tool inertia from a remote server via the radio transceiver.

The cut-off tool may also comprise other means for identifying, e.g., the type of tool. Such means for identification may comprise optically readable tags such as QR-codes, or punch-card like symbols which can be read optically and used to index a database on, e.g., the remote server, to obtain the data indicative of the tool diameter or tool inertia.

Of course, the data indicative of the tool diameter or tool inertia can also be manually input to the control unit 110.

The rotational data can also be obtained from an external sensor, such as a Hall effect sensor arranged to measure a rotational velocity of a shaft in the drive arrangement, such as a motor shaft or a pulley shaft, or even the shaft of the cutting tool 105 itself. This rotational data can be used in combination with the rotor angle estimate data obtained directly from the electric motor, or it can be used in place of this data as an alternative source of information by which the kickback detection can be performed.

Figure 6:
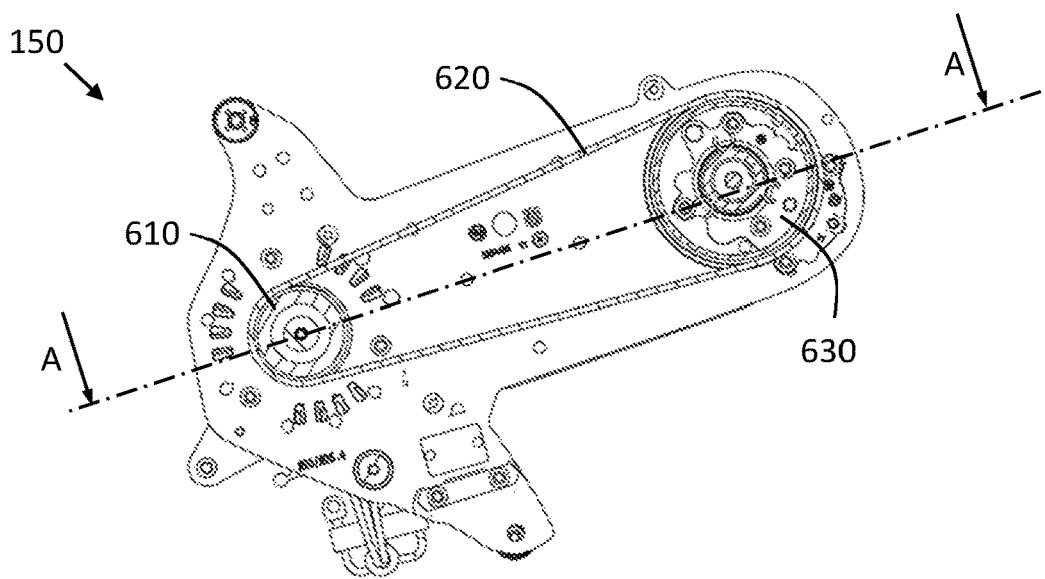
FIG. 6 shows a cut-off tool support arm for a circular cutting blade.
Figure 7:
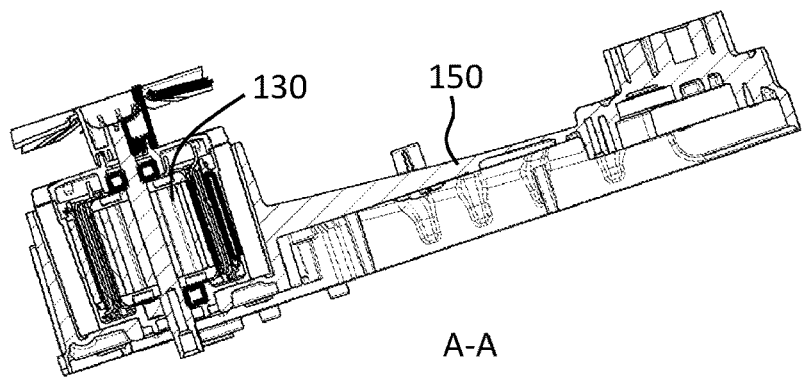
FIG. 7 is a cross-sectional view of a support arm for a circular cutting blade.
Figure 8:
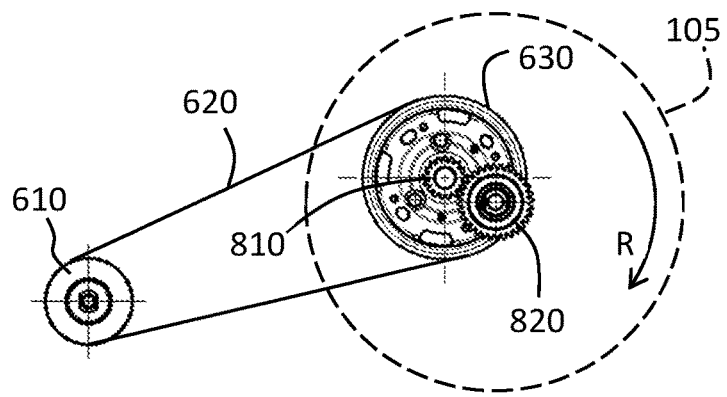
FIG. 8 illustrates a drive arrangement for a circular cutting blade.

With reference to FIGS. 6-8, the cut-off tool 100 may comprise a belt drive arrangement in the support arm 150 configured to provide a drive ratio which reduces the rotational speed of the electric motor drive shaft down to a speed suitable for processing concrete, e.g., about 3500-4500 revolutions per minute (rpm). This is an advantage since electric motors operating at reduced engine speeds are more costly and often also weighs more than standard motors operating around 9000-10000 rpm. Such gear ratios necessitate using a smaller pulley at the motor drive shaft to drive a larger pulley connected to the work tool. However, if the larger pulley is co-axially attached directly to the rotatable work tool, then the attainable cutting depth may be reduced by the large belt pulley.

The drive arrangement illustrated in FIGS. 6-8 is based on a combination of a drive belt portion and a gear transmission portion. The belt drive portion comprises a first pulley 610 and a second pulley 630 with a drive belt 620 in between. To reduce blade speed with respect to a rotational speed of the first pulley, the second pulley has a larger pitch diameter than the first pulley. This drive ratio increases torque and reduces speed making the rotatable work tool suitable for dry cutting operation. The drive arrangement also comprises a gear transmission portion as shown in FIG. 8. The gear transmission portion comprises a first gearwheel 810 and a second gearwheel 820. The first gearwheel 810 is co-axially connected to the second pulley 630 and the second gearwheel 820 is arranged to be co-axially connected to the rotatable work tool 105. Thus, as the first pulley 610 is rotated, the belt 620 drives the second pulley 630 in the same direction of rotation. The second pulley, being co-axially connected to the first gearwheel 810, then drives the first gearwheel in the same direction of rotation as the first pulley 610. The first gearwheel 810 is radially connected to the second gearwheel 820, and therefore drives the second gearwheel in an opposite direction of rotation. Thus, the direction of rotation of the first pulley and the direction of rotation R of the work tool 105 are opposite to each other. This is not a problem when using an electric motor as a power source, which can be configured to rotate in any direction. Thus, the disclosed drive arrangements are especially suited for use with electric motors.

The gear transmission portion is dimensioned to support a braking action by the electric motor to stop rotation by the rotatable work tool from a rotation velocity of about 50 m/sec in 5 ms, for a given belt dimension. Effectively this means that, due to the gear transmission portion, the power source can be parameterized more aggressively for a braking operation, without placing undue requirements on the belt drive portion, and the belt in particular, which is an advantage.

According to some aspects, a ratio of the first gearwheel 810 pitch diameter and the second gearwheel 820 pitch diameter is between 0.4 and 0.6, and preferably 0.56. According to an example, the first gearwheel 810 has a pitch diameter between 20 and 35 mm, preferably 28 mm, and the second gearwheel 820 has a pitch diameter between 40 and 60 mm, preferably 50 mm. Regarding the belt drive portion, the first pulley 610 may be associated with a pitch diameter between 30 and 40 mm, preferably 35.4 mm, and the second pulley 630 may be associated with a pitch diameter between 60 mm and 70 mm, preferably 64.85 mm. According to aspects, a ratio between a pitch diameter of the first pulley and a pitch diameter of the second pulley is between 0.4 and 0.6, and preferably about 0.55. Various types of drive belts can be used in the belt drive portion, such as a v-belt or a toothed belt.

Thus, according to some aspects, the cut-off tool 100 comprises a support arm 150, wherein the rotatable cutting disc 105 is arranged to be driven by the electric motor 130 via a belt drive 610, 620, 630 and a geared transmission 810, 820.

There is also disclosed herein a hand-held electrically powered cut-off tool 100 for cutting concrete and stone by a rotatable cutting disc 105. The cut-off tool 100 comprises an electric motor 130 arranged to be controlled by a control unit 110 via a motor control interface 120 as illustrated in, e.g., FIG. 2 and FIG. 3. The control unit 110 is arranged to determine an angular position of a rotor of the electric motor 130, or, equivalently, of the electric motor shaft, based on a current over the control interface 120, and to obtain data indicative of an angular velocity of the cutting disc 105 based on a rate of change of the angular position of the rotor (or shaft) over time. The control unit 110 is arranged to detect a kickback condition based on a decrease in angular velocity of the cutting disc 105, and to control electromagnetic braking of the electric motor 130 in response to detecting a kickback condition.

Figure 9:
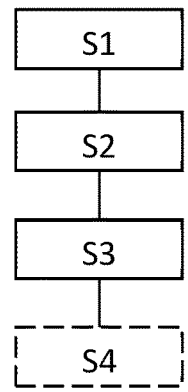
FIG. 9 is a flow chart illustrating methods.

FIG. 9 is a flow chart illustrating methods, there is illustrated a method in a control unit 110 for mitigating kickback in a hand-held electrically powered cut-off tool 100 arranged for cutting concrete and stone by a rotatable cutting disc 105, wherein the cut-off tool 100 comprises an electric motor 130 arranged to be controlled by the control unit 110 via a motor control interface 120. The method comprises obtaining S1 data indicative of an angular velocity of the cutting disc 105, detecting S2 a kickback condition based on a decrease in angular velocity, and electromagnetically braking S3 the electric motor 130 in response to detecting a kickback condition.

Optionally, the method also comprises actively regulating S4 an energy outtake from the electric motor 130 over the control interface 120 during the electromagnetic braking.

Figure 10:
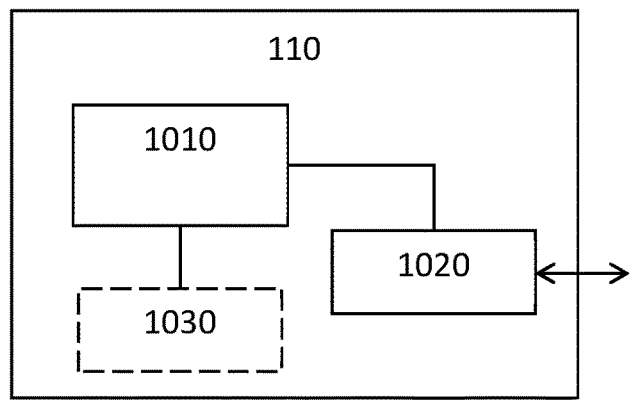
FIG. 10 schematically illustrates a control unit.

FIG. 10 schematically illustrates, in terms of a number of functional units, the general components of a control unit 110. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a storage medium 1030. The processing circuitry 1010 may further be provided as at least one application specific integrated circuit ASIC, or field programmable gate array FPGA.

Particularly, the processing circuitry 1010 is configured to cause the device 180 to perform a set of operations, or steps, such as the methods discussed in connection to FIG. 9 and the discussions above. For example, the storage medium 1030 may store the set of operations, and the processing circuitry 1010 may be configured to retrieve the set of operations from the storage medium 1030 to cause the device to perform the set of operations. The set of operations may be provided as a set of executable instructions. Thus, the processing circuitry 1010 is thereby arranged to execute methods as herein disclosed.

The storage medium 1030 may also comprise persistent storage, which, for example, can be any single one or combination of magnetic memory, optical memory, solid state memory or even remotely mounted memory.

The device 110 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 110, e.g., by sending data and control signals to the interface 1020 and the storage medium 1030, by receiving data and reports from the interface 1020, and by retrieving data and instructions from the storage medium 1030.

Figure 11:
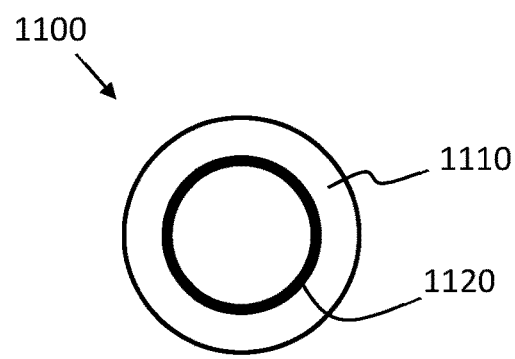
FIG. 11 schematically illustrates a computer program product.

FIG. 11 illustrates a computer readable medium 1110 carrying a computer program comprising program code means 1120 for performing the methods illustrated in FIG. 9, when said program product is run on a computer. The computer readable medium and the code means may together form a computer program product 1100.

The invention claimed is:

1. A hand-held electrically powered cut-off tool for cutting concrete and stone by a rotatable cutting disc, the cut-off tool comprising an electric motor arranged to be controlled by a control unit via a motor control interface,
    wherein the control unit is arranged to obtain data indicative of an angular velocity of the cutting disc, and to detect a kickback condition based on a decrease in angular velocity,
    wherein the control unit is arranged to control an electromagnetic braking of the electric motor in response to detecting a kickback condition, and
    wherein the control unit is arranged to actively regulate an energy outtake from the electric motor over the control interface during the electromagnetic braking.

2. The hand-held electrically powered cut-off tool according to claim 1, wherein the control unit is arranged to estimate a rotor angle of the electric motor based on a measured current over the control interface, and to obtain the data indicative of angular velocity as a difference of the rotor angle over time.

3. The hand-held electrically powered cut-off tool according to claim 1, wherein the control unit is arranged to determine the rotor angle of the electric motor based on data indicative of a rotor flux angle of the electric motor, and to obtain the data indicative of angular velocity as a difference of the rotor angle over time.

4. The hand-held electrically powered cut-off tool according to claim 1, wherein the control unit is arranged to process the data indicative of the angular velocity of the cutting disc by a first low-pass filter and by a second low-pass filter, where the first low-pass filter has a larger bandwidth compared to the second low-pass filter, wherein the first low-pass filter is applied for kickback event detection, and where the second low-pass filter is applied otherwise.

5. The hand-held electrically powered cut-off tool according to claim 1, comprising an energy dissipating module configured to dissipate energy from the electric motor during the electromagnetic braking.

6. The hand-held electrically powered cut-off tool according to claim 5, wherein the energy dissipating module comprises any of a resistance, a super-capacitor, a cable connection to electrical mains and/or a battery configured with an energy absorption capacity.

7. The hand-held electrically powered cut-off tool according to any previous claim 1, wherein the control unit is arranged to obtain the data indicative of an angular velocity of the cutting disc at least in part from an external sensor.

8. The hand-held electrically powered cut-off tool according to claim 1, wherein the cut-off tool comprises a radio transceiver, and wherein the control unit is arranged to obtain data indicative of the tool diameter or tool inertia from a remote server via the radio transceiver.

9. The hand-held electrically powered cut-off tool according to claim 1, wherein the control unit is configured to control the electromagnetic braking of the electric motor by applying a configurable braking torque in dependence of a pre-determined time limit for braking the rotatable cutting disc,
    wherein the control unit is configured to control the electromagnetic braking of the electric motor to generate a torque determined in dependence of a direct current, DC, bus voltage of the cut-off tool,
    wherein the control unit is configured to control the electromagnetic braking of the electric motor to generate a torque determined in dependence of an energy dissipating capability of the energy dissipating module, or
    wherein the control unit is configured to control the electromagnetic braking of the electric motor to generate a braking torque below a maximum braking torque level associated with a maximum rate of change in motor shaft angular speed.

10. The hand-held electrically powered cut-off tool according to claim 1, wherein a direct current, DC, bus voltage of the cut-off tool is regulated by switching a device associated with an impedance during electromagnetic braking of the electric motor.

11. The hand-held electrically powered cut-off tool according to claim 1, comprising a support arm, wherein the rotatable cutting disc is arranged to be driven by the electric motor via a belt drive and a geared transmission.

12. The hand-held electrically powered cut-off tool according to claim 1, wherein the control unit is arranged to prevent operation of the tool during a time window following detection of the kickback condition.

13. The hand-held electrically powered cut-off tool according to claim 12, wherein the time window is between 2 seconds long,
    wherein the time window is configured in dependence of a tool inertia, or
    wherein the time window is configured in dependence of a temperature of the electric motor and/or energy dissipating module.

14. The hand-held electrically powered cut-off tool according to claim 1, wherein the control unit is arranged to suppress detection of a kickback condition during a time period following start of the electric motor, or
    wherein the control unit is arranged to suppress detection of a kickback condition unless the tool engages an object to be cut.

15. A method in a control unit for mitigating kickback in a hand-held electrically powered cut-off tool arranged for cutting concrete and stone by a rotatable cutting disc, wherein the cut-off tool comprises an electric motor arranged to be controlled by the control unit via a motor control interface, the method comprising
    obtaining data indicative of an angular velocity of the cutting disc,
    detecting a kickback condition based on a decrease in angular velocity, and
    controlling electromagnetic braking of the electric motor in response to detecting a kickback condition, wherein the controlling comprises actively regulating an energy outtake from the electric motor over the control interface during the electromagnetic braking.

16. A hand-held electrically powered cut-off tool for cutting concrete and stone by a rotatable cutting disc, the cut-off tool comprising an electric motor arranged to be controlled by a control unit via a motor control interface,
    wherein the control unit is arranged to determine an angular position of a rotor of the electric motor based on a current over the control interface, and to obtain data indicative of an angular velocity of the cutting disc based on a rate of change of the angular position of the rotor over time,
    wherein the control unit is arranged to detect a kickback condition based on a decrease in angular velocity of the cutting disc, and to control electromagnetic braking of the electric motor in response to detecting a kickback condition, and wherein the control unit is arranged to actively regulate an energy outtake from the electric motor over the control interface during the electromagnetic braking.

17. A hand-held electrically powered cut-off tool for cutting concrete and stone by a rotatable cutting disc, the cut-off tool comprising an electric motor arranged to be controlled by a control unit via a motor control interface, wherein the control unit is arranged to obtain data indicative of an angular velocity of the cutting disc, and to detect a kickback condition based on a decrease in angular velocity, wherein the control unit is arranged to control an electromagnetic braking of the electric motor in response to detecting a kickback condition, wherein the electrically powered cut-off tool comprises an energy dissipating module configured to dissipate energy from the electric motor during the electromagnetic braking.

18. The hand-held electrically powered cut-off tool according to claim 17, wherein the control unit is configured to control the electromagnetic braking of the electric motor to generate a torque determined in dependence of an energy dissipating capability of the energy dissipating module.

19. The hand-held electrically powered cut-off tool according to claim 17, wherein the energy dissipating module comprises any of a resistance, a super-capacitor, a cable connection to electrical mains and/or a battery configured with an energy absorption capacity.

20. The hand-held electrically powered cut-off tool according to claim 17, wherein a direct current, DC, bus voltage of the cut-off tool is regulated by switching a device associated with an impedance during electromagnetic braking of the electric motor.

* * * * *

UNITED STATES PATENT AND TRADEMARK OFFICE
CERTIFICATE OF CORRECTION

PATENT NO. : 12,103,201 B2
APPLICATION NO. : 18/032260
DATED : October 1, 2024
INVENTOR(S) : Magnus Rosén et al.

Page 1 of 1

It is certified that error appears in the above-identified patent and that said Letters Patent is hereby corrected as shown below:

In the Claims

In Column 19, Claim 7, Line 50, "any previous claim 1" should read -- claim 1 --

In Column 20, Claim 13, Line 27, "2 seconds long" should read -- 2-30 seconds long --

Signed and Sealed this
Eighteenth Day of March, 2025

Coke Morgan Stewart
*Acting Director of the United States Patent and Trademark Office*